United States Patent [19]

Stepto et al.

[11] Patent Number: 5,382,611
[45] Date of Patent: Jan. 17, 1995

[54] DESTRUCTURIZED STARCH AND METHOD FOR MAKING SAME

[75] Inventors: Robert F. T. Stepto, Riehen; Ivan Tomka, Lenzburg; Beat Dobler, Basel, all of Switzerland; Keith Pyrah, Rogerstone, United Kingdom

[73] Assignee: Warner-Lambert Company, Morris Plains, N.J.

[21] Appl. No.: 14,034

[22] Filed: Feb. 5, 1993

Related U.S. Application Data

[63] Continuation of Ser. No. 888,693, May 21, 1992, abandoned, which is a continuation of Ser. No. 701,554, May 16, 1991, abandoned, which is a continuation of Ser. No. 356,025, May 23, 1989, abandoned, which is a continuation of Ser. No. 163,340, Mar. 2, 1988, abandoned.

[30] Foreign Application Priority Data

Mar. 9, 1987 [GB] United Kingdom ............... 8705442

[51] Int. Cl.⁶ ............... C08L 89/06; C08L 101/00; C09H 9/02; B29C 45/00
[52] U.S. Cl. .......................... 524/47; 524/52; 524/53; 536/102; 536/103; 536/124
[58] Field of Search .................. 524/47, 52, 53; 536/102, 103, 124

[56] References Cited

U.S. PATENT DOCUMENTS

| | | |
|---|---|---|
| 536,260 | 3/1895 | Bloede . |
| 2,894,859 | 7/1959 | Wimmer et al. . |
| 3,137,592 | 6/1964 | Protzman et al. ............... 536/102 |
| 3,297,480 | 1/1967 | Matsuda et al. ............... 127/71 |
| 3,423,239 | 1/1969 | Goos ............... 536/102 |
| 3,490,917 | 1/1970 | Doe et al. ............... 127/71 |
| 3,508,964 | 4/1970 | Roemer et al. ............... 536/102 |
| 3,546,066 | 12/1970 | Ware et al. ............... 162/175 |
| 3,974,032 | 8/1976 | Harjes et al. ............... 426/48 |
| 4,256,509 | 3/1981 | Tuschhoff et al. ............... 127/32 |
| 4,256,771 | 3/1981 | Henderson et al. ............... 426/250 |
| 4,337,181 | 6/1982 | Otey et al. ............... 523/128 |
| 4,551,177 | 11/1985 | Trubiano et al. ............... 106/210 |
| 4,587,332 | 5/1986 | Lane et al. ............... 536/102 |
| 4,900,361 | 2/1990 | Sachetto et al. ............... 106/213 |

FOREIGN PATENT DOCUMENTS

| | | |
|---|---|---|
| 0087847 | 9/1983 | European Pat. Off. . |
| 0118240 | 9/1984 | European Pat. Off. . |
| 0159631 | 10/1985 | European Pat. Off. . |
| 0282451 | 9/1988 | European Pat. Off. . |
| 1171893 | 11/1969 | United Kingdom . |
| 1472659 | 5/1977 | United Kingdom . |
| 2190093 | 5/1986 | United Kingdom . |

OTHER PUBLICATIONS

Viscosity-Molecular Weight Relations, By C. T. Greenwood, Department of Chemistry, The University, Edinburgh, Scotland.

Light Scattering, By Joseph F. Foster, Department of Chemistry, Purdue University, Lafayette, Ind.

*Primary Examiner*—Nathan M. Nutter
*Attorney, Agent, or Firm*—Fitzpatrick, Cella Harper & Scinto

[57] ABSTRACT

A destructurized native starch material is described which has a water content in the range of about 10 to 25% by weight and that its mass average molar mass is reduced by a factor of 2 to 5000 compared to its original mass average molar mass. The destructurized starch is produced by heating a chemically non-modified starch material having a water content in the range of about 5 to 25% by weight of the total weight of the composition in the presence of a chain scission catalyst in a closed volume to an elevated temperature sufficient to form a thermoplastic melt and until the mass average molar mass is reduced by a factor of 2 to 5000.

22 Claims, No Drawings

DESTRUCTURIZED STARCH AND METHOD FOR MAKING SAME

This application is a continuation of U.S. patent application Ser. No. 07/888,693, filed May 21, 1992 (now abandoned), which in turn is a continuation of U.S. patent application Ser. No. 07/701,554, filed May 16, 1991 (now abandoned), which itself is a continuation of U.S. patent application Ser. No. 07/356,025 filed May 23, 1989 and now abandoned which itself is a continuation of U.S. patent application Ser. No. 07/163,340, filed Mar. 2, 1988 (now abandoned).

The present invention refers to destructurized starch and to a method for making same.

It has recently become known that natural starch which is found in vegetable products and which contains a defined amount of water, can be treated at elevated temperature and in a closed vessel, thereby at elevated pressure, to form a melt. The process is conveniently carried out in an injection molding machine or extruder. The starch is fed through the hopper onto a rotating, reciprocating screw. The feed material moves along the screw towards the tip. During this process, its temperature is increased by means of external heaters around the outside of the barrel and by the shearing action of the screw. Starting in the feed zone and continuing in the compression zone, the particulate feed becomes gradually molten. It is then conveyed through the metering zone, where homogenization of the melt occurs, to the end of the screw. The molten material at the tip can then be further treated by injection molding or extrusion or any other known technique to treat thermoplastic melts.

This treatment, which is described in the European Patent Application No. 84 300 940.8 (Publication No. 118 240) yields a destructurized starch. The reason for this being that the starch is heated above the melting and glass transition temperatures of its components so that they undergo an endothermic transition. As a consequence a melting and disordering of the molecular structure of the starch granule takes place, so that a destructurized starch is obtained.

Although such destructurized starch is useful in molding techniques and extrusion it has been found, that the molded parts show a relatively high incidence of surface defects and the processed materials generally have relatively lower extensibilities.

It has now been found, that the above mentioned disadvantages can be overcome by heating starch, having a water content in the range of 10 to 25%, in a closed volume to elevated temperatures in the presence of a chain scission catalyst until the mass average molar mass of the native starch is reduced by a factor within the range of 2 to 5000.

The starch material obtained according to the present invention also exhibits improved flow characteristics especially for the production of thin walled articles so that due to the improved processability, defective parts are minimized as well as necessary subsequent controls reduced. Also lower pressures can be used for processing e.g. in injection molding processing as well as lower temperatures.

The present invention therefore refers to a method for producing destructurized starch, comprising a chemically non-modified starch material having a water content in the range of about 10 to 25% by weight of the total weight of the composition, in the presence of a chain scission catalyst in a closed volume to an elevated temperature sufficient to form a thermoplastic melt and continuing heating until the mass average molar mass of said starch material is reduced by a factor of 2 to 5000, compared with its original mass average molar mass.

The present invention also refers to destructurized starch obtained by this method.

The "starch composition" means the starch/water composition therein being included the optional additives as described later on.

The term destructurized starch has been explained above. Chemically non-modified starch as such includes for example native starch, was well as gelatinized or cooked starch and includes generally carbohydrates of natural, vegetable origin, composed mainly of amylose and/or amylopectin. It may be extracted from various plants, examples being potatoes, rice, tapioca, corn, and cereals such as rye, oats and wheat.

Various values can be found in the literature for the mass average molar masses of different starches. The term "its mass average molar mass is reduced by a factor of 2 to 5000 compared to its original mass average molar mass" is to be understood as follows:

Starch as any polymeric material is made of macromolecules whose molar masses are not all the same. The molar mass of individual macromolecules cannot be measured but what can be measured is an average of the molar mass of all the molecules.

Among the absolute methods used for the determination of average molar mass, light scattering is most favoured and has been applied to almost all conceivable types of macromolecules. Light scattering weighs the various molecules in a sample according to their masses and hence yields a mass average molar mass. Because of that, the method does not break down at very high molecular weights and this is a basic advantage over other methods. However, the light scattering measurement of mass average molar masses requires the dissolution of the polymers in a solvent.

In case of native starch for example, no solvent is available to achieve a convenient solution for the measurement. Consequently, the average molar mass of native starch must be determined by extrapolation from a plot correlating the light scattering mass average molar masses of lower molecular weight starches soluble in dimethylsulphoxide (DMSO) as the solvent to their intrinsic viscosities in both DMSO/6 molar aqueous urea 9:1 and DMSO as solvents. The solvent DMSO/6 molar aqueous urea 9:1 can be used to dissolve native starch and to measure the intrinsic viscosity but cannot be used for light scattering.

Therefore a linear plot log molar mass (as obtained from soluble lower molecular mass starches through light scattering) as a function of log $[\eta]$ ($\eta$=intrinsic viscosity, as obtained from the intrinsic viscosity measurement of the corresponding lower molar mass starches) permits to determine the average molar mass of native starch from its intrinsic viscosity measurement by extrapolating the upper part of the plot to its intrinsic viscosity value.

When native starch is treated with the catalysts under the conditions claimed in the present invention, the starch macromolecules are split in a statistical manner and distinct from enzymatic degradation producing a low proportion of fragments of very low molar mass.

The splitting is due to the statistical breakdown of the $\alpha$-1,4 glycosidic bonds with the corresponding reduction of the average molar mass of the initial macromolecules.

Therefore the ratio of the average molar mass values of native starch and catalytically modified starch is a measure of the extent of the catalytically induced modification.

In the present case the weight average molar mass of potato starch was experimentally determined from intrinsic viscosity measurements to be about $6 \times 10^8$. A reduction by a factor of 100 would therefore lead to a weight average molar mass of about $6 \times 10^6$.

The method of using light scattering to measure the mass average molar mass of starch is described in Methods in Carbohydrate Chemistry, Vol IV, Starch, Academic Press, 1964, p. 191-202.

The use of the intrinsic viscosity for molar mass determination of starch is described in Methods in Carbohydrate Chemistry, Vol IV, Starch, Academic Press, 1964, p. 179-188.

Starch can also be characterized by its dextrose equivalent (DE), i.e. the granules of dextrose which have the same reducing sugar content as 100 grammes of the starch sample. The DE-values measured for the starch samples obtained according to the present invention were in the range of 40 to 700.

The starch material has a water content in the range of about 10 to 25% and better 10 to 20% calculated to the weight of starch composition. Preferred is a final water content of 12 to 19% and especially 14 to 18% calculated to the weight of starch composition.

The starch material is heated to elevated temperatures sufficient to form a thermoplastic melt i.e. temperatures higher than the glass transition and/or melting temperature of the formed material. Such temperatures are preferably in the range of 100° to 200° C., preferably 140° to 190° C. Most preferred are temperatures within the range of 160° to 185° C.

A thermoplastic melt is a polymeric fluid having a shear rate dependent viscosity, as generally known. The starch melts according to this invention have similar magnitudes and dependences of viscosity on shear rate as conventional thermoplastic melts like e.g. those of polyethylene. This also means that viscosity decreases with increasing shear rate as well as with increasing temperature.

The starch material is heated preferably in a closed volume. A closed volume can be a closed vessel or the volume created by the sealing action of the unmolten feed material as happens in the screw of injection molding or extrusion equipment. In this sense the screw-barrel of an injection molding machine or an extruder is to be understood as being a closed vessel. Pressures created in a closed vessel correspond to the vapour pressure of water at the used temperature but of course pressure may be applied as this is normally done in a screw-barrel. The preferred applied pressures to be used are in the range of the pressures which are applied in extrusion or injection molding processes and known per se, i.e. from zero to $150 \times 10^5 N/m^2$ preferably from zero to $75 \times 10^5 N/m^2$ and most particularly from zero to $50 \times 10^5 N/m^2$.

The melt of destructurized starch according to this invention is e.g. injected under the normal range of pressures used in injection molding namely for thicker walled articles in the range from $300 \times 10^5 N/m^2$ to $3.000 \times 10^5 N/m^2$, preferably $700 \times 10^5$-$2200 \times 10^5 N/m^2$.

A chain scission catalyst is a catalyst which acts by splitting mainly the α-1,4 glycosidic bonds in the starch macromolecule in a statistical manner regular manner.

Useful catalysts are acids and bases including Lewis acids and bases or any reagent which can catalyse the splitting of the α-1,4 glycosidic bond in a statistical manner.

Suitable acids are inorganic acids such as hydrochloric acid, sulfuric acid, nitric acid, phosphoric acid, arsenic acid, o-boric acid, hydrocyanic acid, hydrofluoric acid, hypobromous acid, hypochlorous acid, iodic acid, nitrous acid, periodic acid, phosphorous acid, pyrophosphoric acid, o-silicic acid, sulfurous acid, tetraboric acid, etc. including the partial salts of the polybasic acids, e.g. $NaHSO_4$, $NaH_2PO_4$ etc. and Lewis acids such as boron fluoride, aluminium chloride etc. i.e. compounds which can attach themselves to the unshared pair of electrons of the oxygen of α-1,4 glycosidic bond and catalyse its splitting or a mixture of these compounds.

Suitable are further organic acids such as formic acid, acetic acid, propionic acid, n-butyric acid, halogenacetic acid, lactic acid, glycolic acid, oxalic acid, malonic acid, citric acid, tartaric acid, itaconic acid, succinic acid, gluconic acid, glutaric acid, adipic acid, pimelic acid, organo-sulfonic acid, benzoic acid, ethylenediamine tetracetic acid (EDTA), acetic amino acids such as glutamic acid, aspartic acid, or a mixture of these compounds as well as partial salts of the polyacids mentioned, e.g. disodium EDTA.

Preferred are hydrochloric acid, sulfuric acid, disodium-EDTA, citric acids or a mixture of these compounds.

Suitable bases are inorganic bases such as sodium hydroxide, potassium hydroxide, calcium hydroxide, magnesium hydroxide, ammonia, aluminium hydroxide, hydrazine, or a mixture of these compounds.

Suitable are further organic bases and Lewis bases such as methylamine, ethylamine, propylamine, butylamine, and homologues, aniline, benzylamine, ethanediamine, propanediamine, butanediamine hexamethylenediamine, morpholine, pyridine, piperidine, basic amino acids such as arginine, asparagine, glutamine, histidine, tryptophan or a mixture of these compounds.

Preferred are ammonia, sodium hydroxide, potassium hydroxide, calcium hydroxide, magnesium hydroxide, tryptophan or a mixture of these compounds.

The acids mentioned above are the preferred catalysts. The reduction of the mass average molar mass of the original (chemically non-modified) starch used is by the factor 2 to 5000, preferably by a factor of 4 to 1000 and most preferably by a factor of 5 to 300.

The usual heating time is about 2-10 minutes and preferably 4-8 minutes, but this time indication is not critical and can be varied.

The concentration of catalysts is in the range of $10^{-6}$ to $10^{-2}$ mole of catalyst per mole of anhydro-glucose unit (AGU), preferably between $0.1 \times 10^{-3}$ to $5 \times 10^{-3}$ mole/AGU.

The starch material of the present invention may contain or may be mixed with additives such as extenders, lubricants, plasticizers and/or coloring agents. Such materials are named in the European Patent Application No. 84 300 940.8 (Publ. No. 118 240) and are incorporated herewith by reference.

In this sense, these additives may be added before, during or after heating the starch to form the melt. After heating would mean e.g. when the melt is cooled down before further processing. It mainly depends on the intended use of the destructurized starch.

Such additives are extenders of different kinds, e.g. gelatin, vegetable proteins such as sunflower protein, soybean proteins, cotton seed proteins, peanut proteins, rape seed proteins, blood proteins, egg proteins, acrylated proteins; water-soluble polysaccharides such as:

alginates, carrageenans, guar gum, agar-agar, gum arabic and related gums (gum ghatti, gum karaya, gum tragacauth) pectin; water-soluble derivatives of cellulose: alkylcelluloses hydroxyalkylcelluloses and hydroxyalkylalkylcelluloses, such as: methylcellulose, hydroxymethylcellulose, hydroxyethylcellulose, hydroxypropylcellulose, hydroxyethylmethylcellulose, hydroxpropylmethylcellulose, hydroxybutylmethylcellulose, celluloseesters and hydroxyalkylcelluloseesters such as: celluloseacetylphtalate (CAP), Hydroxypropylmethylcellulose (HPMCP); carboxyalkylcelluloses, carboxyalkylalkylcelluloses, carboxyalkylcelluloseesters such as: carboxymethylcellulose and their alkalimetal salts; water-soluble synthetic polymers such as: polyacrylic acids and polyacrylic acid esters, polymethacrylic acids and polymethacrylic acid esters, polyvinylacetates, polyvinylalcohols, polyvinylacetatephthalates (PVAP), polyvinylpyrrolidone, polycrotonic acids; suitable are also phtalated gelatin, gelatin succinate, crosslinked gelatin, shellac, water soluble chemical derivatives of starch, cationically modified acrylates and methacrylates possessing, for example, a tertiary or quaternary amino group, such as the diethylaminoethyl group, which may be quaternized if desired; and other similar polymers.

Such extenders may optionally be added in any desired amount preferably up to and including 50%, preferably within the range of 3% to 10% based on the weight of all components.

The choice of catalyst and extender should be done in such a way that both are compatible i.e. that the catalyst cannot be harmful to the extender and also retains its own activity. This principle is of course applied also with respect to the additives mentioned further on.

Further additives are inorganic fillers, such as the oxides of magnesium, aluminum, silicon, titanium, etc. preferably in a concentration in the range of about 0.02 to 3% by weight preferably 0.02 to 1% based on the weight of all components.

Further examples of additives are plasticizers which include polyalkylene oxides, such as polyethylene glycols, polypropylene glycols, polyethylene-propylene glycols; organic plasticizers with low molecular weights, such as glycerol, glycerol monoacetate, diacetate or triacetate; propylene glycol, sorbitol, sodium diethylsulfosuccinate, triethyl citrate, tributyl citrate, etc., added in concentrations ranging from 0.5 to 15%, preferably ranging from 0.5 to 5% based on the weight of all the components.

Examples of coloring agents include known azo dyes, organic or inorganic pigments, or coloring agents of natural origin. Inorganic pigments are preferred, such as the oxides of iron or titanium, these oxides, known per se, being added in concentrations ranging from 0.001 to 10%; preferably 0.5 to 3%, based on the weight of all the components.

The sum of the plasticizer and water contents should preferably not exceed 25%, and should most preferably not exceed 20%, based on the weight of all the components.

There may further be added compounds lubricants to improve the flow properties of the starch material such as animal or vegetable fats, preferably in their hydrogenated form, especially those which are solid at room temperature. These fats have preferably a melting point of 50° C. or higher. Preferred are Triglycerides with $C_{12}$-, $C_{14}$-, $C_{16}$-, and $C_{18}$-fatty acids.

These fats can be added alone without adding extenders or plasticizers.

These fats can advantageously be added alone or together with mono-and/or diglycerides or phosphatides, especially lecithin. The mono- and diglycerides are preferably derived from the types of fats described above, i.e. with $C_{12}$-, $C_{14}$-, $C_{16}$-, and $C_{18}$- fatty acids.

The total amounts used of the fats mono-, diglycerides and/or lecithins are up to 5% and preferably within the range of about 0.5 to 2% by weight of the total composition.

It is further recommended to add silicon dioxide or titanium dioxide in a concentration of about 0.02 to 1% by weight of the total composition. These compounds act as texturizing agent.

According to the present invention, the materials treated as described herein above form on heating and in a closed vessel a melt with thermoplastic properties, i.e. under controlled water-content and pressure conditions. Such a melt can be used in various techniques just like thermoplastic materials. These techniques include injection molding, blow molding, extrusion and coextrusion (rod, pipe and film extrusion), compression molding, vacuum forming, to produce known articles as produced with these techniques. These articles include bottles, sheets, films, packaging materials, pipes, rods, laminates, sacks, bags, pharmaceutical capsules.

The following examples further explain the invention.

EXAMPLE 1

Natural potato starch, Type AVEBE, a lubricant-/release agent (hydrogenated fat) and a melt flow accelerator (lecithin), a texturizing agent ($TiO_2$) and hydrochloric acid (1 molar) are mixed together in the relative proportions in a high speed powder mixer for 10 minutes so that a composition consisting of 82,3 parts of natural potato starch, 0,83 parts of the hydrogenated triglyceride containing the fatty acids $C_{18}$: $C_{16}$: $C_{14}$ in a ratio of 65:31:4 weight percent, 0,415 parts lecithin, 0,415 parts titanium dioxide and 17 parts water in the form of a freely flowing powder is obtained. This powder contains the chain scission catalyst (HCl) in a proportion of 0, $8\times10^{-3}$ mole per mole of AGU.

This powder is fed into the hopper and fed to the screw barrel having a temperature of 170°–180° C. and an applied pressure of 55–75 bar and kept at these conditions for 7 minutes. It was then injected into an injection molding tool for capsule body and cap parts whose mold wall temperature was kept at 40° C. using an injection molding pressure of 1000 bar. After cooling and ejecting from the mold a dimensionally stable capsule body and cap part is obtained which can easily be processed on a filling machine.

The analysis of the molar mass was done by determination of the viscosity and correlation with the light scattering measurements. The reduction of the molar mass was a factor of 4,7 and gave an improvement of a capsule quality down to 1% defects compared to 9% obtained from the above composition without having added HCl to it.

EXAMPLE 2

Natural potato starch Type SUD with the same additives as in Example 1 and $0.5 \times 10^{-3}$ mole hydrochloric acid/AGU is processed in the same manner as in Example 1 (Temp: 170° C., 50 bar pressure, 7 minutes). The analysis of the molar mass was done by determination of the viscosity and correlation with the light scattering measurements. The reduction of the molar mass was a factor of 2,5 and gave an improvement of capsule quality down to 0.7% of defects compared with 5% of defects obtained with the same starch composition without having added the acid. Analogous results are obtained with rice starch.

TABLE 1 (EXAMPLES 3 TO 16)

In the following table 1 there are given Examples where potato starch has been mixed with the same additives as described in the Examples 1 and 2 but processed under various acid contents, temperatures and residence times, obtaining different values for the reduction factors of the mass average molar masses of the starches used. The applied pressures were as described in Example 1. Considerable improvements in the numbers of defects were consistently obtained. The experiments also showed, that it is possible to reduce the mass average molar mass by heating starch at elevated temperatures and pressures without the addition of a chain scission catalyst. However, this reduction alone does not give the consistent reduction in defects. Surprisingly, the presence of the chain scission catalyst in combination with the reduction in the mass average molar mass to values within the limits of 2 to 5000 as described above are necessary to obtain the results of the present invention.

It is well known that different samples of natural starch materials show variations in their structures and properties. The consistent reductions in defects surprisingly occur in spite of such variation differences in the structures and properties of the granules of the various native potato starches used.

Table 2 shows further compositions that are treated analogously as described in the Examples 1 or 2.

TABLE 1

| Example No. | Type of starch: potato | Scission catalyst | Catalyst concentration mol/AGU | Temp. in the screw barrel °C. | Residence time in the screw barrel (nozzle) sec. | Reduction factor MW native starch/ HW product | Number of defects in % |
| --- | --- | --- | --- | --- | --- | --- | --- |
| 3 | Südstärke | (a) none | — | 170 | 475 | 184 | 5.0 |
|   | Batch 1 | (b) HCl | $0.5 \times 10^{-3}$ | 165 | 475 | 475 | 0.7 |
| 4 | Roquette | (a) none | — | 160 | 665 |  | 13 |
|   | Batch 2 | (b) $H_2SO_4$ | $0.5 \times 10^{-3}$ | 155 | 590 |  | 3.7 |
| 5 | Roquette | (a) none | — | 160 | 665 |  | 33 |
|   | Batch 3 | (b) $H_2SO_4$ | $0.5 \times 10^{-3}$ | 155 | 590 |  | 3.8 |
| 6 | Roquette | (a) none | — | 160 | 665 |  | 29 |
|   | Batch 4 | (b) $H_2SO_4$ | $0.55 \times 10^{-3}$ | 155 | 590 |  | 3.8 |
| 7 | Roquette | (a) none | — | 160 | 665 |  | 100 |
|   | Batch 9 | (b) $H_2SO_4$ | $0.55 \times 10^{-3}$ | 155 | 590 |  | 3.2 |
| 8 | Roquette | (a) none | — | 160 | 665 |  | 68 |
|   | Batch 7 | (b) $H_2SO_4$ | $0.6 \times 10^{-3}$ | 150 | 590 |  | 2.7 |
| 9 | Roquette | (a) none | — | 160 | 665 |  | 100 |
|   | Batch 8 | (b) $H_2SO_4$ | $0.65 \times 10^{-3}$ | 155 | 590 |  | 3.2 |
| 10 | Roquette | (a) none | — | 160 | 665 |  | 68 |
|   | Batch 5 | (b) $H_2SO_4$ | $0.7 \times 10^{-3}$ | 155 | 590 |  | 3.5 |
| 11 | Avebe | (a) none | — | 160 | 665 |  | 29 |
|   | Batch 3 | (b) $H_2SO_4$ | $0.75 \times 10^{-3}$ | 155 | 590 |  | 3.8 |
| 12 | Avebe | (a) none | — | 170 | 500 | 52 | 5.0 |
|   | Batch 2 | (b) HCl | $0.8 \times 10^{-3}$ | 165 | 450 | 259 | 0.3 |

TABLE 2

| | STARCH | | COMPONENT b) | | COMPONENT c) | | COMPONENT d) | | WATER | OTHERS | |
| --- | --- | --- | --- | --- | --- | --- | --- | --- | --- | --- | --- |
| No. | Type | % | Type | % | Type | % | Type | % | % | Type | % |
| 13 | Potato | 75.00 | hydrated vegetable fat | 1.25 | Lecithin | 1.5 | $TiO_2$ | 0.25 | 22.0 | — | — |
| 14 | Potato | 80.00 | hydrated vegetable fat | 1.0 | " | 0.9 | " | 0.1 | 18.0 | — | — |
| 15 | Potato | 88.6 | hydrated vegetable fat | 0.8 | " | 0.5 | $SiO_2$ | 0.1 | 10.0 | — |  |
| 16 | Wheat | 78.0 |  | — | Monoglycerid $C_{18}$ | 5.0 | " | 3.04 | 19.0 | dyestuff | 0. |
| 17 | Wheat | 79.0 | hydrated vegetable fat | 2.05 | — | — | $TiO_2$ $SiO_2$ 1:1 | 0.95 | 18.0 | — | — |
| 18 | Wheat | 85.0 | hydrated animal fat | 2.80 | — | — | $TiO_2$ | 0.20 | 12.0 | — | — |
| 19 | Maize | 75.0 | hydrated animal fat | 4.80 | Monoglycerid $C_{18}$ | 0.2 | " | 0.15 | 17.0 | pre-cooked starch | 2.85 |
| 20 | Maize | 78.0 | hydrated animal fat | 3.0 | Monoglycerid $C_{18}$ | 1.0 | " | 0.05 | 14.0 | pre-cooked starch | 3.95 |
| 21 | Rice | 79.0 | animal fat |  | Monoglycerid $C_{18}$ | 2.0 | $SiO_2$ | 1.0 | 17.5 | dyestuff | 0.5 |
| 22 | Rice | 80.25 | hydrated animal fat | 0.9 | Diglyceride $C_{18}, C_{16}$ | 0.6 | " | 0.25 | 15.0 | Glycerin |  |
| 23 | Tapioca | 75.2 | hydrated animal fat | 0.9 | Diglyceride $C_{18}, C_{16}$ | 0.6 | " | 0.3 | 21.0 | HMPCP | 2 |
| 24 | Potato | 73.96 | hydrated | 2.0 | Diglyceride | 2.0 | " | 0.04 | 17.0 | PEG 1000 | 5 |

TABLE 2-continued

| No. | STARCH Type | % | COMPONENT b) Type | % | COMPONENT c) Type | % | COMPONENT d) Type | % | WATER % | OTHERS Type | % |
|---|---|---|---|---|---|---|---|---|---|---|---|
| 25 | Potato | 75.25 | animal fat hydrated animal fat | 1.5 | $C_{18}$, $C_{16}$ Diglyceride $C_{18}$, $C_{16}$ | 1.0 | $TiO_2$ | 0.25 | 18.0 | PEG 4000 | 4 |
| 26 | Potato | 75.25 | vegetable fat | 1.5 | Lecithin | 1.0 | " | 0.25 | 18.0 | Sorbitol | 4 |
| 27 | Wheat | 60.00 | " | 1.5 | " | 1.2 | " | 0.25 | 17.0 | Polyacrylic acid | 20.05 |

We claim:

1. A method for producing a composition for use in the manufacture of shaped articles, said method comprising the steps of:
   (a) providing a chemically non-modified starch material, with a mass average molar mass and having a water content within the range of from about 10 to about 25% by weight based on the total weight of the composition;
   (b) heating the starch material in a closed volume to a temperature within the range of from about 100° C. to about 200° C., and at a pressure within the range of from about zero to about $150 \times 10^5$ N/m², wherein the starch material is heated in the presence of a chain scission catalyst at a concentration of chain scission catalyst within the range of from about $0.1 \times 10^{-3}$ to about $5 \times 10^{-3}$ moles of catalyst per mole of anhydroglucose unit to form a thermoplastic melt; and
   (c) heating the thermoplastic melt of step (b) wherein the mass average molar mass of the starch material is reduced by a factor within the range of from about 2 to about 5000, through the action of the chain scission catalyst which cleaves -1,4- glycosidic bonds in starch macromolecules, compared with its original mass average molar mass.

2. The method of claim 1, wherein said chemically non-modified starch is selected from the group consisting of native or granular starch, gelatinized starch and cooked starch.

3. The method of claim 1, wherein the water content of said non-modified starch material is within the range of from about 10% to about 20% based on the total weight of the composition.

4. The method of claim 1, wherein said starch material has a water content within the range of from about 12% to about 19% based on the weight of the starch composition.

5. The method claim 1, wherein said starch material has a water content within the range of from about 14% to about 18% based on the weight of the starch composition.

6. The method of claim 1, wherein said chain scission catalyst is selected from the group consisting of Lewis acids, organic acids and inorganic acids.

7. The method of claim 1, wherein said chain scission catalyst is selected from the group consisting of Lewis bases, organic bases and inorganic bases.

8. The method of claim 6, wherein said chain scission catalyst is selected from the group consisting of hydrochloric acid, sulfuric acid, nitric acid, phosphoric acid, boric acid, nitrous acid, phosphorous acid, pyrophosphoric acid, sulfurous acid, tetraboric acid and partial salts of polybasic acids, EDTA and citric acid.

9. The method of claim 1, wherein said chain scission catalyst is present in a concentration within the range of from about $0.1 \times 10^{-3}$ to about $5 \times 10^{-3}$ mole of catalyst per mole of anhydro-glucose units.

10. A destructurized starch composition made by the method of claim 1.

11. The method according to claim 1, further comprising an additive selected from the group consisting of extenders, inorganic fillers, plasticizers, coloring agents, lubricants and continuation thereof, wherein the additive is added to the composition before, during or after the starch material is heated to form a thermoplastic melt.

12. The method according to claim 11, wherein at least one extender is added to the composition in an amount within the range of up to about 50% based on the weight of all components.

13. The method according to the claim 12, wherein the extender is added to the composition within the range of from about 3% to about 10% based on the weight of all components.

14. The method according to claim 11, wherein at least one inorganic filler is added to the composition in a concentration within the range of from about 0.02 to about 3% based on the weight of all components.

15. The method according to claim 11, wherein a plasticizer is added to the composition in an amount within the range of from about 0.5% to about 15% based on the weight of all components.

16. The method according to claim 11, wherein a coloring agent is added to the composition in an amount within the range of from about 0.001% to about 10% based on the weight of all components.

17. The method according to claim 11, wherein a plasticizer is added to the composition in an amount which, when taken together with the water content, does not exceed about 25% based on the weight of all components.

18. The method according to claim 11, wherein a lubricant is added to the composition to improve the flowproperties of the composition in an amount of up to about 5% by weight of the total composition.

19. The method according to claim 11, wherein silicon dioxide or titanium dioxide is added to the composition in a concentration within the range of about 0.02% to about 1% by weight of the total composition.

20. The method according to claim 1, wherein the thermoplastic starch melt is shaped into an article of manufacture by a process selected from the group consisting of injection molding, blow molding, extrusion and coextrusion, compression molding and vacuum forming.

21. The method according to claim 20, wherein the article of manufacture are shaped as bottles, sheets, films, packaging materials, pipes, rods, laminates, sacks, bags or pharmaceutical capsules.

22. A process for using a composition comprising destructurized starch in the manufacture of shaped articles, wherein the composition is produced by a method comprising the steps of:
(a) providing a chemically non-modified starch material having a water content within the range of from about 10% to about 25% based on the total weight of the material, and
(b) heating the composition in a closed volume to a temperature within the range of from about 100° C. to about 200° C., at a pressure within the range of from about zero to about $150 \times 10^5$ N/m$^2$, in the presence of a chain scission catalyst at a concentration of chain scission catalyst within the range of from about $0.1 \times 10^{-3}$ to about $5 \times 10^{-3}$ moles of catalyst per mole of anhydroglucose unit, wherein the chain scission catalyst is capable of reducing the average molar mass of the starch in the starch material by a factor within the range of from about 2 to about 5000.

* * * * *

UNITED STATES PATENT AND TRADEMARK OFFICE
CERTIFICATE OF CORRECTION

PATENT NO. : 5,382,611

DATED : January 17, 1995

INVENTORS : ROBERT F.T. STEPTO, ET AL.

It is certified that error appears in the above-identified patent and that said Letters Patent is hereby corrected as shown below:

COLUMN 1

Line 45, "extrusion" should read --extrusion,-- and
      "found," should read --found--.
Line 62, "ing" should read --ing,--.

COLUMN 2

Line 13, "was" should read --as--.
Line 40, "case" should read --the case--.

COLUMN 3

Line 32, "melt" should read --melt,--.
Line 42, "like" should read --like,--.
Line 64, "is" should read --is,--.
Line 67, "3.000X$10^5$ N/$m^2$," should read
      --3000X$10^5$ N/$m^2$,--.

COLUMN 4

Line 16, "etc." should read --etc.,--.
Line 68, "mean" should read --mean,--.

COLUMN 5

Line 10, "tragacauth)" should read --tragacanth)--.
Line 38, "compatible" should read --compatible,--.
Line 45, "weight" should read --weight,--.

UNITED STATES PATENT AND TRADEMARK OFFICE
CERTIFICATE OF CORRECTION

PATENT NO. : 5,382,611

DATED : January 17, 1995

INVENTORS : ROBERT F.T. STEPTO, ET AL.

It is certified that error appears in the above-identified patent and that said Letters Patent is hereby corrected as shown below:

COLUMN 6

Line 11, "mono-and/or" should read --mono- and/or--.
Line 24, "herein above" should read --hereinabove--.

COLUMN 7

Line 17, "table 1" should read --Table 1--.

COLUMN 8

Line 4, "showed," should read --showed--.

COLUMN 9

Line 36, "-1,4- glyco-" should read --$\alpha$-1,4-glyco- --.
Line 51, "method" should read --method of--.

COLUMN 10

Line 51, "flowproperties" should read --flow-properties--.
Line 64, "article" should read --articles--.

UNITED STATES PATENT AND TRADEMARK OFFICE
CERTIFICATE OF CORRECTION

PATENT NO. : 5,382,611

DATED : January 17, 1995

INVENTORS : ROBERT F.T. STEPTO, ET AL.

It is certified that error appears in the above-identified patent and that said Letters Patent is hereby corrected as shown below:

COLUMN 11

Line 6, "material," should read --material;--.

Signed and Sealed this

Eighteenth Day of July, 1995

Attest:

BRUCE LEHMAN

*Attesting Officer*        *Commissioner of Patents and Trademarks*